US009593554B2

(12) United States Patent
Salihbegovic

(10) Patent No.: US 9,593,554 B2
(45) Date of Patent: Mar. 14, 2017

(54) DUAL STEM INJECTION VALVE

(71) Applicant: Weatherford Technology Holdings, LLC, Houston, TX (US)

(72) Inventor: Zlatko Salihbegovic, New Iberia, LA (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 14/834,831

(22) Filed: Aug. 25, 2015

(65) Prior Publication Data
US 2016/0053579 A1  Feb. 25, 2016

Related U.S. Application Data

(60) Provisional application No. 62/041,389, filed on Aug. 25, 2014.

(51) Int. Cl.
*E21B 34/14* (2006.01)
*E21B 34/10* (2006.01)
*F16K 25/04* (2006.01)
*E21B 34/08* (2006.01)
*E21B 37/06* (2006.01)

(52) U.S. Cl.
CPC ............ *E21B 34/14* (2013.01); *E21B 34/085* (2013.01); *E21B 34/10* (2013.01); *E21B 37/06* (2013.01); *F16K 25/04* (2013.01)

(58) Field of Classification Search
CPC ........ E21B 34/085; E21B 34/10; E21B 34/14; E21B 37/06; F16K 25/04
See application file for complete search history.

(56) References Cited

U.S. PATENT DOCUMENTS

| 2004/0084190 | A1  | 5/2004  | Hill et al. |
| 2009/0277643 | A1  | 11/2009 | Mondelli et al. |
| 2010/0116501 | A1  | 5/2010  | Chan et al. |
| 2013/0153044 | A1* | 6/2013  | Woodford ............ G05D 7/0133 137/14 |
| 2014/0182855 | A1  | 7/2014  | Woodford |

FOREIGN PATENT DOCUMENTS

| GB | 2 489 730 A | 10/2012 |
| WO | 2011/157985 A1 | 12/2011 |
| WO | WO 2014037584 A1 * | 3/2014 ............. E21B 34/08 |
| WO | 2015/058261 A1 | 4/2015 |

OTHER PUBLICATIONS

European Patent Office; Extended European Search Report for Application No. 15182130.3; dated Jan. 29, 2016; 6 total pages.

* cited by examiner

*Primary Examiner* — James G Sayre
(74) *Attorney, Agent, or Firm* — Patterson & Sheridan, LLP

(57) ABSTRACT

Embodiments of the present disclosure relate to an injection valve with improved pressure regulation and/or improved erosion resistance. One embodiment of the injection valve includes a first stem and a second stem forming a closure mechanism, and a seal member engaging the first stem. The seal between the seal member and the first stem provides a constant sealing surface and enables precise regulation to the opening pressure. The seal member is protected from high pressure differential flow and erosion damage because the seal member is not exposed to the fluid flow when the injection valve switches between an open and a closed positions.

20 Claims, 7 Drawing Sheets

DUAL STEM INJECTION VALVE

CLAIM OF PRIORITY UNDER 35 U.S.C. 119

This application claims benefit of U.S. Provisional Patent Application No. 62/041,389, filed Aug. 25, 2014, and entitled "Dual Stem Injection Valve," which is herein incorporated by reference in its entirety.

BACKGROUND

Field

Embodiments of the present disclosure generally relate to valves used to control the injection of chemicals, fluids and water for treatment of harmful depositions and erosion in tubing and around downhole tools.

Description of the Related Art

Chemical injection is the process of injecting fluid chemicals into the production stream of a well to control corrosion and harmful deposits in the tubing and tubing accessories during production. In a typical chemical injection installation, a chemical injection mandrel with a chemical injection valve is installed as part of the production-tubing string. Injection chemicals are pumped down to an inlet port of the chemical injection mandrel through the tubing/casing annulus or a dedicated chemical injection line by a chemical injection pump. The chemical injection valve opens to allow the injection chemicals into the tubing when the pressure of the injection chemical exceeds a predetermined valve opening pressure and closes when the pressure drops.

The chemical injection valves incur a large number of open/close cycles because the chemical injection valves open and close with every stroke of the piston in the chemical injection pump. Standard chemical injection valves use metal to metal seal. For example, a standard chemical injection valve uses a spring loaded stem mechanism with a ball and seat closure. When the valves perform a large number of open/close cycles, the valves may leak because the metal to metal sealing surfaces become damaged by erosion and contact loads. In addition, the conical surface of the seat does not provide constant sealing diameter, which results in an imprecise opening pressure. Elastomer seals sometimes are used on the outer diameter of the stem or the inner diameter of a bore in the seal to provide a constant sealing diameter and improve pressure regulation. However, the elastomer seals cannot survive a long period of time due to the flow erosion caused by high fluid discharge pressure and/or a large number of open/close cycles.

Therefore, there is a need for chemical injection valves with improved pressure regulation and/or improved erosion resistance.

SUMMARY

Embodiments of the present disclosure generally relate to chemical injection valves with improved erosion resistance and/or pressure regulation.

In one embodiment, a valve includes a housing defining an inner volume, wherein the housing has an inlet port and an outlet port, a seal member disposed in the housing between the inlet port and the outlet port, and a first stem disposed in housing. The seal member engages an outer diameter of the first stem to form a seal, the seal between the seal member and the first stem divides the inner volume to an inlet volume and an outlet volume, a fluid channel is formed through the first stem, the fluid channel has an inlet and an outlet, the inlet of the fluid channel opens at the inlet volume, the first stem is movable relative to the sealing member so that the outlet of the fluid channel moves between the inlet volume and the outlet volume.

In another embodiment, an injection valve includes a housing having an inlet port and an outlet port, a seal member disposed in the housing between the inlet port and the outlet port, and a first stem disposed in the housing. A first end of the first stem is a closed end, a fluid channel between a second end and an outer surface of the first stem. The first stem movably engages the seal member at the outer surface. The injection valve further includes a second stem disposed between the outlet port and the seal member. The second stem has a bore, and the closed end of first stem selectively contacts the second stem to open and close the bore.

In another embodiment, a method for performing chemical injection includes biasing a first stem and a second stem in an injection valve towards each other to close a bore in the second stem. The first stem and second stem are disposed between an inlet port and an outlet port of the injection valve. The first stem includes a fluid channel having an inlet and an outlet, a seal member engages an outer surface of the first stem. The inlet and the outlet of the fluid channel are between the seal member and the inlet port. The method further includes supplying a fluid pressure from the inlet port to move the first stem towards the outlet port so that the outlet of the fluid channel in the first stem travels across the seal member, and opening the injection valve by supplying an opening pressure from the inlet port to separate to the first stem from the second stem.

BRIEF DESCRIPTION OF THE DRAWINGS

So that the manner in which the above recited features of the present disclosure can be understood in detail, a more particular description of the various aspects, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
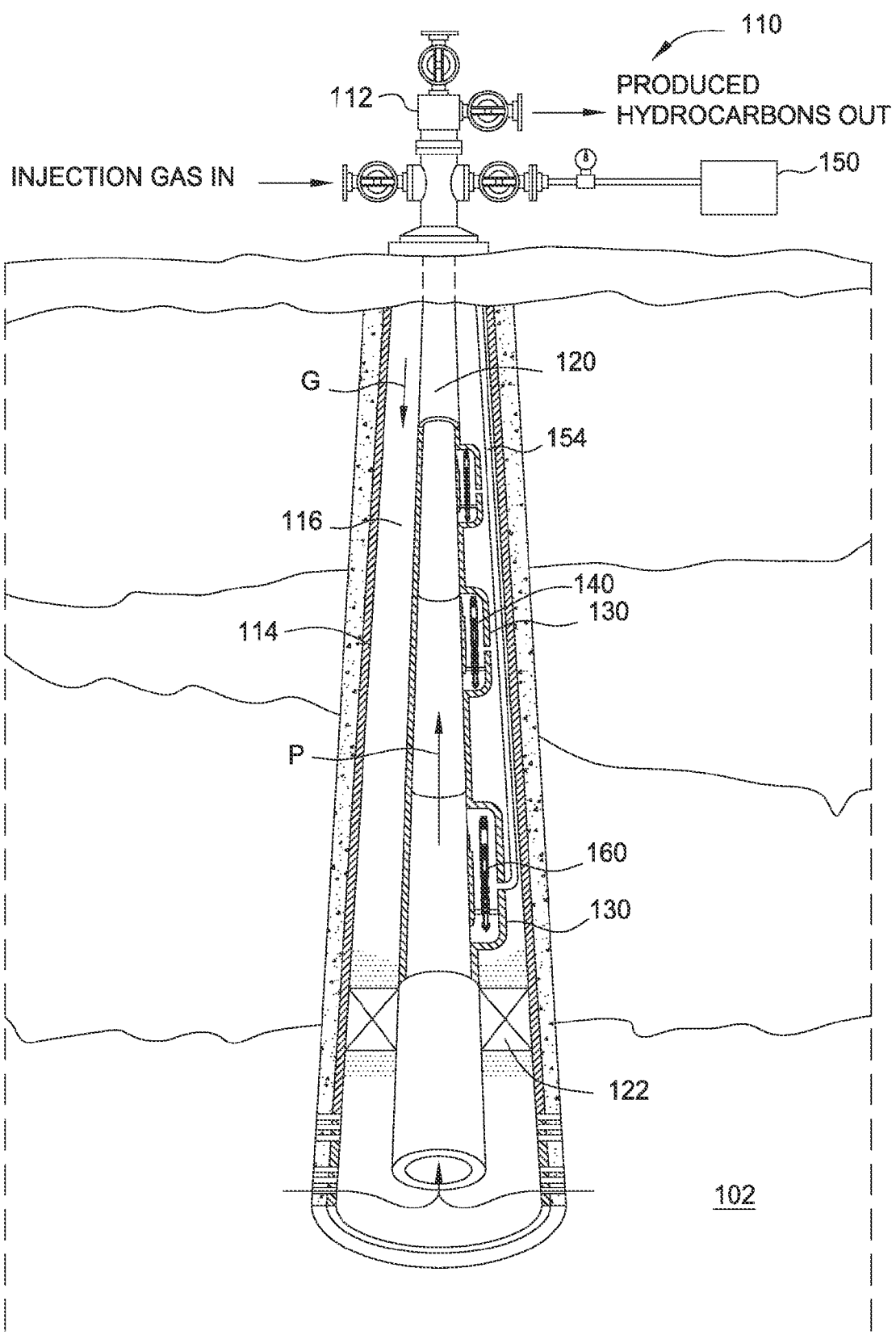
FIG. 1 is a cross-sectional view of a well completion including a chemical injection valve in accordance with an embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Embodiments of the present disclosure relate to an injection valve with improved pressure regulation and/or improved erosion resistance, and/or improved sealing/closing feature. One embodiment of the injection valve includes a first stem and a second stem forming a closure mechanism, and a seal member engaging the first stem. The seal between the seal member and the first stem provides a constant sealing surface and enables precise regulation to the opening pressure. The seal member is protected from high pressure differential flow and erosion damage because the seal member is not exposed to the fluid flow when the injection valve switches between an open position and a closed position. The seal member is always engaged between an outer diameter and an inner diameter. The injection valves according to present disclosure are suitable for control fluid flow of high pressure and/or harsh chemicals, for example controlling flow during chemical injection in well completion.

FIG. 1 illustrates a well completion 110 for hydrocarbon recovery, which may include a wellhead 112 atop a casing 114 that passes through a formation 102. Production tubing 120 positioned in the casing 114 may have a number of side pocket mandrels 130 and a production packer 122. To conduct chemical injection, operators may install a chemical injection valve 160 in one of the side pocket mandrels 130. A chemical pump 150 may be installed at the surface to inject chemicals down the annulus 116 or through a separate injection line 154 attached to the mandrel 130. The chemical injection valve 160 is normally in a closed position. The chemical injection valve 160 opens when the chemical injection pressure exceeds an opening pressure and allows the chemicals to flow into the production tubing 120.

Optionally, chemical injection may be conducted with gas lift operation. To conduct gas lift operation, operators may install gas lift valves 140 in some of the side pocket mandrels 130. Compressed gas G from the wellhead 112 may be injected into the annulus 116 between the production tubing 120 and the casing 114 or injected into the tubing 120. The gas lift valves 140 selectively allow the compressed gas from the annulus 116 into the tubing 120 or from the tubing 120 into the annulus 116 to lift the production fluid P or the annulus fluid.

Figure 2A:
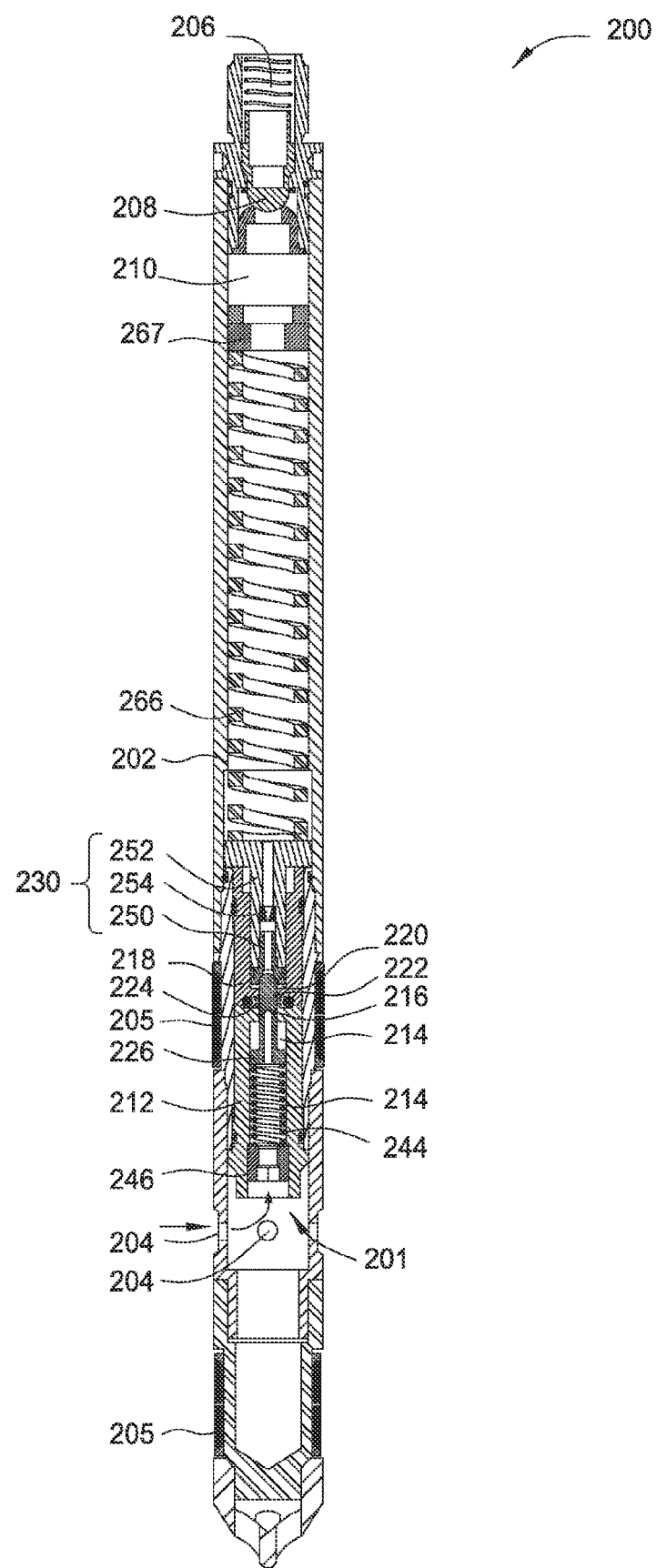
FIG. 2A is a schematic sectional view of a chemical injection valve according to one embodiment of the present disclosure in a closed position.

FIG. 2A is a schematic sectional view of a chemical injection valve 200 according to one embodiment of the present disclosure in a closed position. The chemical injection valve 200 may be used in a side pocket mandrel in a well completion, such as the side pocket mandrel 130 in FIG. 1.

The chemical injection valve 200 includes a housing 202 defining an inner volume 210. An inlet port 204 and an outlet port 206 may be formed through the housing 202. The inlet port 204 may include one or more openings through the housing 202. Similarly, the outlet port 206 may include one or more openings through the housing 202. Packing seals 205 may be disposed on the housing 202 at either side of the inlet port 204 to seal around the inlet port 204. A check valve 208 may be disposed in the inner volume 210 between the inlet port 204 and the outlet port 206. The check valve 208 prevents back flow from the outlet port 206 to the inlet port 204.

Figure 2B:
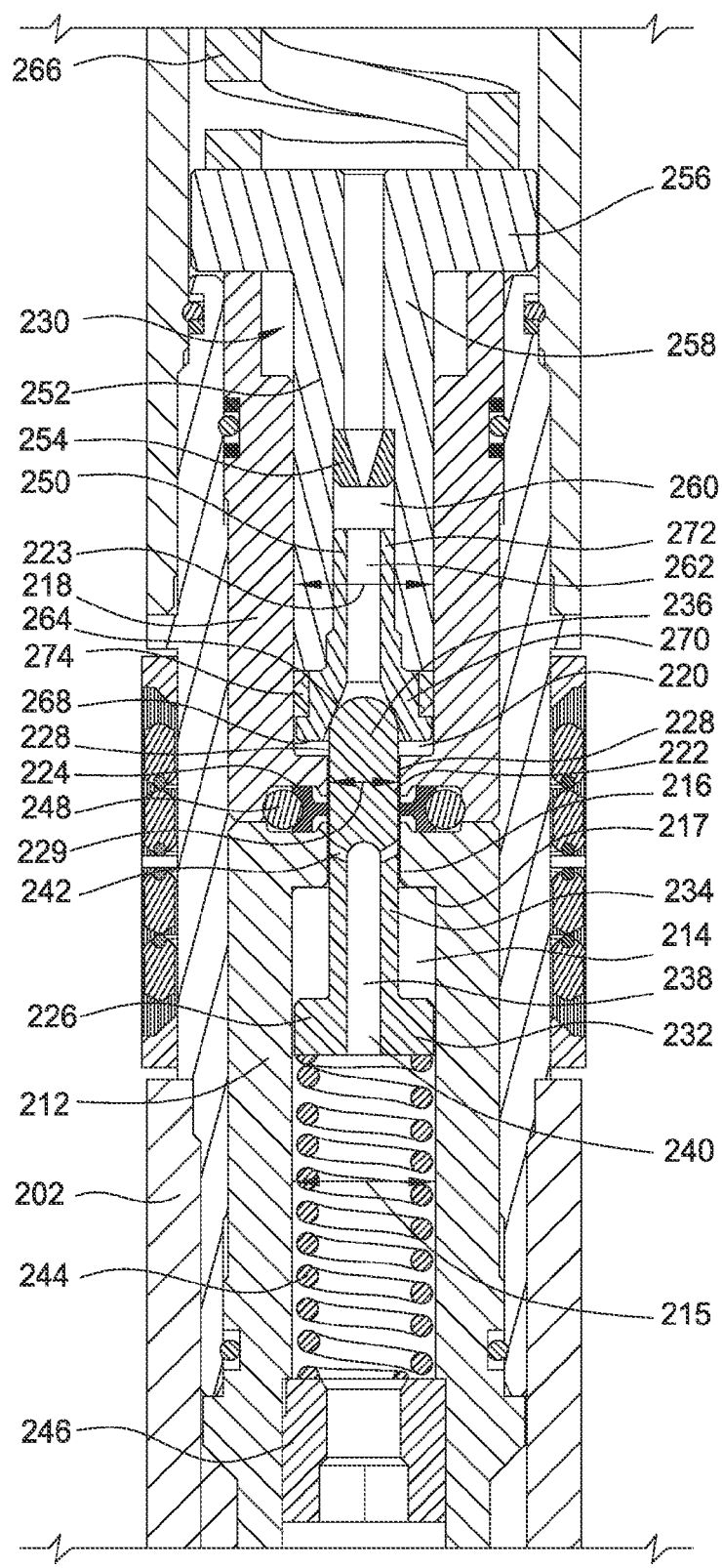
FIG. 2B is a partial enlarged view of FIG. 2A.

The passage between the inlet port 204 and the outlet port 206 is selectively opened and closed by a valve mechanism 201 disposed in the housing 202. FIG. 2B is a partial enlarged view of FIG. 2A showing the valve mechanism 201 according to one embodiment of the present disclosure. The valve mechanism 201 includes a first stem 226 movably disposed in the housing 202. A seal member 224 engages an outer diameter 229 of the first stem 226. A second stem 230 is movably disposed in the housing 202 between the seal member 224 and the outlet port 206. The first stem 226 and the second stem 230 may be biased towards each other to close the flow between the inlet port 204 and the outlet port 206. An increase in the pressure of fluid flow from the inlet port 204 may cause the first stem 226 and the second stem 230 to move together in the housing 202, and then to move relative to each other causing the first stem 226 and the second stem 230 to separate from each other to open the flow between the inlet port 204 and the outlet port 206.

The housing 202 may be formed from one or more components. For example, the housing 202 may be formed by multiple tubular components. In one embodiment, the housing 202 may include a first tubing 212 and a second tubing 218 configured to accommodate the first stem 226 and the second stem 230. The first tubing 212 and the second tubing 218 may be disposed in an outer tubular of the housing 202. The first tubing 212 defines a first volume 214 having an inner diameter 215. The first volume 214 is in fluid communication with the inlet port 204. The first tubing 212 may have an opening 216. The opening 216 has a smaller inner diameter than the inner diameter 215 creating a shoulder 217. The second tubing 218 defines a second volume 220. The second volume 220 may be cylindrical with an inner diameter 223. The second volume 220 may be in fluid communication with the outlet port 206. An opening 222 is formed below the second volume 220. The opening 222 has a smaller inner diameter than the inner diameter 223. The opening 222 of the second tubing 218 and the opening 216 of the first tubing 212 may have similar inner diameters. It is contemplated that the housing 202 may include other suitable arrangements for housing stems 226, 230 and seal member 224.

The first stem 226 may include a head portion 232 and a stem portion 234 extending from the head portion 232. The head portion 232 is larger in size than the stem portion 234. The stem portion 234 may be a cylindrical outer surface 228 having an outer diameter 229. In one embodiment, the stem portion 234 may have a closed end 236 on the distal end from the head portion 232. The closed end 236 may have a tapered tip. The closed end 236 is configured to contact with the second stem 230 and to close a bore 262 through the second stem 230. The closed end 236 may be formed from a material with high resistance to abrasion and impact. In one embodiment, the closed end 236 may be formed from tungsten carbide. In another embodiment the closed end 236 may be formed from a metal.

The first stem 226 has a fluid channel 238 formed therein. The fluid channel 238 has an entrance 240 at the head portion 232. The fluid channel 238 may include one or more outlets 242 formed through the stem portion 234. In one embodiment, the outlets 242 may be plurality of openings evenly distributed around a circumference of the first stem 226. As shown in FIG. 2B, the outlets 242 are positioned below the seal 224 when the valve 200 is in the closed position. The fluid channel 238 may include a central bore that opens at the head portion 232 and terminates in the first stem 226. A plurality of passages fluidly connects the central bore to the outer surface 228.

The head portion 232 of the first stem 226 may be disposed in the first tubing 212 while the stem portion 234 may be disposed through the opening 216 of first tubing 212 and the opening 222 of the second tubing 218.

A bias element 244 may be coupled to the first stem 226 to bias the first stem 226 towards the second stem 230. In one embodiment, the bias element 244 may be a spring disposed in the first volume 214 of the first tubing 212 between the head portion 232 and a spring stop 246. The spring stop 246 may be a threaded nut having a central opening may be fixedly positioned in the first tubing 212. The bias element 244 is adapted to bias the first stem 226 upwards. The shoulder 217 of the first tubing 212 provides a stop to the upward movement of the first stem 226.

The seal member 224 may be disposed between the first tubing 212 and the second tubing 218. The seal member 224 is positioned to engage the outer surface 228 of the first stem 226, thereby creating a seal between the first volume 214 and the second volume 220. In one embodiment, the seal member 224 may be an elastomer seal. In one embodiment, an O-ring 248 may be used to bias the seal member 224 toward the outer surface 228 of the first stem 226.

The outer surface 228 remains engaged with the seal member 224 when the first stem 226 moves within its range of motion. The outlet 242 of the fluid channel 238 may be formed in a location so that the outlet 242 may move between opposite sides of the seal member 224 when the first stem 226 moves relative to the seal member 224 within its range of motion. In one embodiment, the outer diameter of the stem portion 234 may be reduced at the area of the outlet 242 to prevent the seal member 226 from being damaged by edges of the outlet 242.

The second stem 230 may be formed as a single piece or assembled from multiple components. In one embodiment, the second stem 230 may include a base 252 and a seat 250 attached to the base 252. The base 252 may have a head portion 256 and a stem portion 258 extending from the head portion 256. The stem portion 258 may have an outer diameter substantially similar to the inner diameter 223 of the inner volume 220. The stem portion 258 may be movably disposed in the second volume 220 of the second tubing 218. The base 252 may have a central bore 260 formed through the stem portion 258 and the head portion 256.

The seat 250 may have a top 270 and a shaft 272. The shaft 272 may be inserted into the central bore 260 from the stem portion 258 while a lower surface 268 of the top 270 faces the first stem 226. The lower surface 268 may be a circular surface having a diameter substantially similar to the inner diameter 223 of the inner volume 220. The seat 250 may have the bore 262 formed along an axial direction. The bore 262 has a contact surface 264 configured to engage the closed end 236 of the first stem 226. The contact surface 264 and the closed end 236 may be shaped to mate with each other so that the bore 262 is closed when the contact surface 264 is in contact with the closed end 236. In one embodiment, the contact surface 264 may be a conical surface and the closed end 236 may be an arcuate surface. The seat 250 may be formed from material having high resistance to abrasion and impact. In one embodiment, the seat 250 may be formed from tungsten carbide. In another embodiment, the seat 250 may be formed from a metal.

In one embodiment, the second stem 230 may include a seal member 274 disposed between the base 252 and the seat 250. The seal member 274 may be pushed towards the second tubing 218 to form a seal between the second stem 230 and the second tubing 218.

In one embodiment, a nozzle 254 may be disposed in the central bore 260 of the base 252. The nozzle 254 improves the fluid passage through the chemical injection valve 200. An exemplary nozzle 254 is a conical nozzle to allow easier self-cleaning and/or unplugging of debris.

As shown in FIG. 2A, a bias element 266 may be disposed in the housing 202. The bias element 266 is configured to bias the second stem 230 towards the first stem 226. In one embodiment, the bias element 266 may be a spring. For example, the bias element 266 may be a power spring formed from INCONEL® material. A force adjustment device 267 may be coupled to the bias element 266 to adjust the force of the bias element 266. In one embodiment, the force adjustment device 267 may be a nut adjustably attached to the housing 202. The force of the bias element 266 may be increased or decreased by moving the force adjustment device 267 up or down relative to the housing 202. The force of the bias element 266 may be adjusted to set an opening pressure of the chemical injection valve 200. In one embodiment, the bias element 266 is much stronger than the bias element 244 so that the bias element 266 can be set and/or adjusted to regulate the opening pressure, and the bias element 244 may be used to maintain contact between the first stem 226 and the second stem 230 before the chemical injection valve 200 opens.

In operation, the chemical injection valve 200 may be disposed in a side pocket mandrel, such as the side pocket mandrel 130 of FIG. 1. The chemical injection valve 200 may be installed so that the inlet port 204 is fluidly connected to the annulus between the tubing and the casing, such as the annulus 116, or to a chemical injection line coupled to a chemical injection pump. The outlet port 206 may be connected to the tubing.

The chemical injection valve 200 is shown in a normal, closed position in FIGS. 2A-2B. In the closed position, there is no fluid input to the inlet port 204, or the fluid pressure at the inlet port 204 is lower than a predetermined opening pressure. The opening pressure may be determined by one or more of preset force of the bias element 266, the inner diameter 215, the outer diameter 229, and the fluid pressure at the outlet port 206. In the closed position, the bias elements 244 and 266 push the first stem 226 and the second stem 230 together so that the closed end 236 of the first stem 226 closes the bore 262 of the second stem 230. Also, the outlet 242 of the fluid channel 238 in the first stem 226 is located below the seal member 224. The seal member 224 is also not in contact with the fluid from the inlet port 204. Therefore the seal member 224 avoids being damaged by high pressure or by harsh chemicals when in the closed position.

When the combined force of the bias element 266 and the fluid pressure at the outlet port 206 is greater than the force applied to the first stem 226 from the fluid pressure at the inlet port 204, the chemical injection valve 200 remains at the closed position. When the forced applied to the first stem 226 by the fluid from the inlet port 204 becomes greater than the combined force of the bias element 266 and the fluid pressure at the outlet port 206, the chemical injection valve 200 transitions from the closed position towards an open position.

Figure 2C:
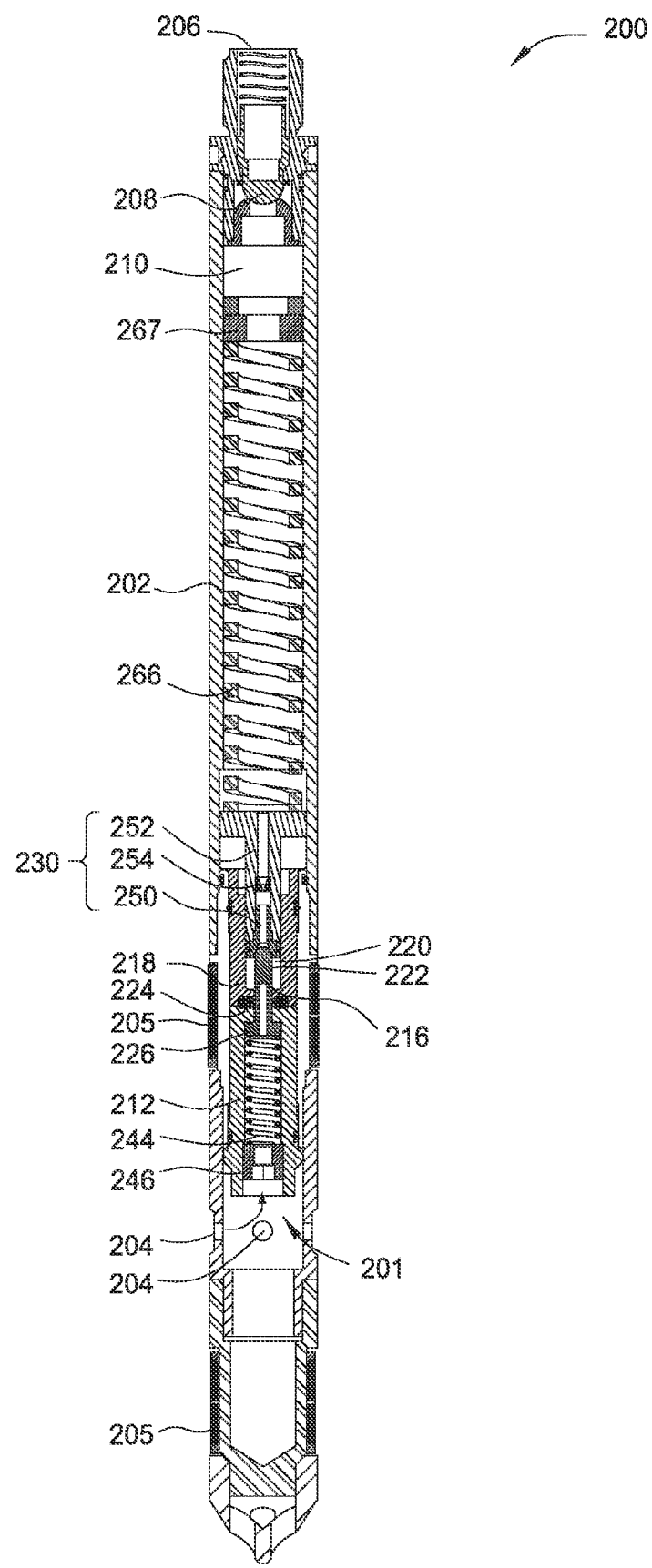
FIG. 2C is a schematic sectional view of the chemical injection valve in an intermediate position.
Figure 2D:
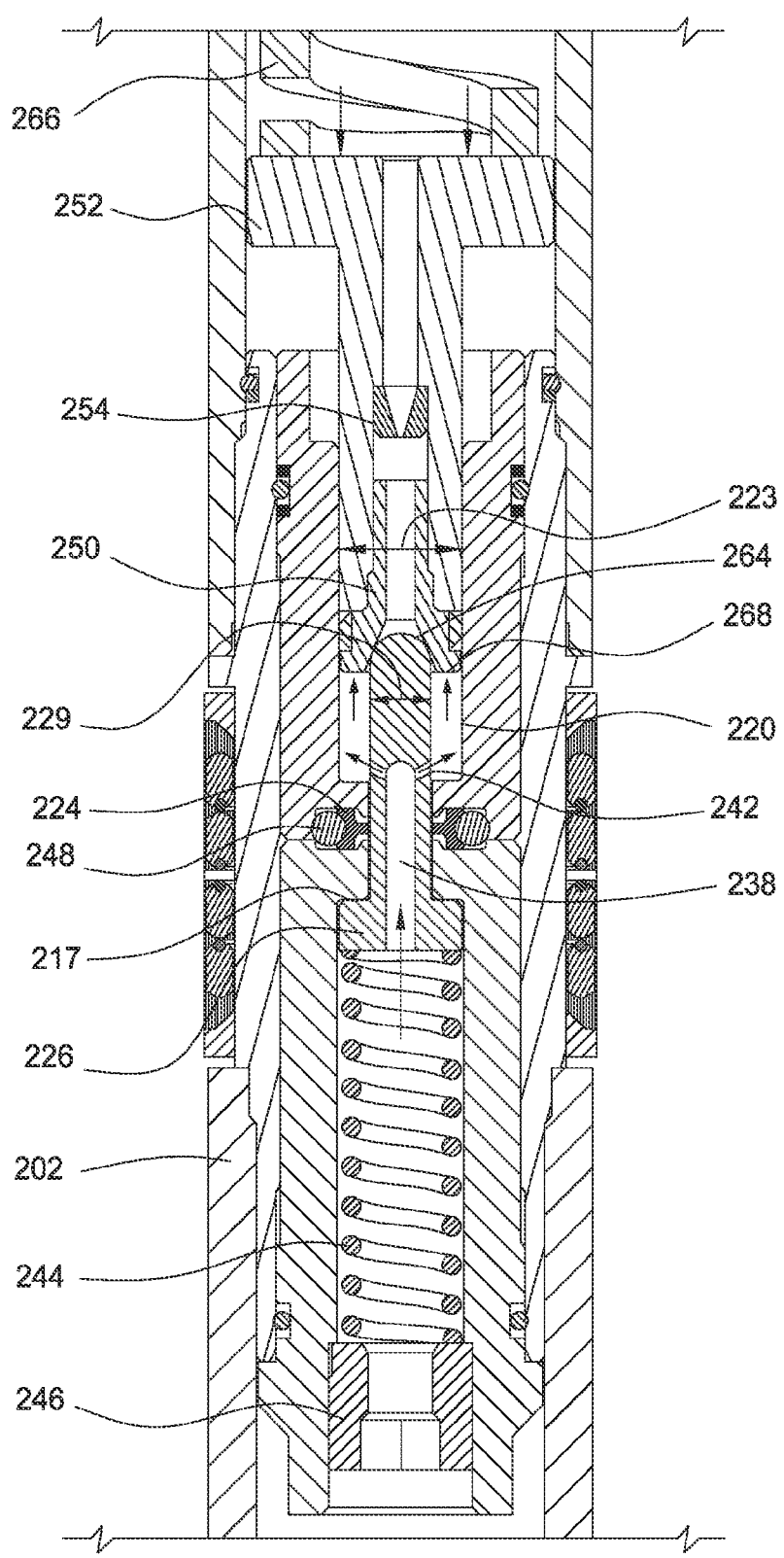
FIG. 2D is a partial enlarged view of FIG. 2C.

FIGS. 2C and 2D are schematic sectional views of the chemical injection valve 200 in an intermediate position between the close position and the open position. During transition, the force applied to the first stem 226 causes the first stem 226 and the second stem 230 to move together towards the outlet port 206. As the first stem 226 moves upwards, the outlet 242 of the fluid channel 238 in the first stem 226 moves from a position upstream from the seal member 224 to a position downstream from the seal member 224.

In FIG. 2D, the outlet 242 of the fluid channel 238 has traveled across the seal member 224. Because the first stem 226 remains in contact with the second stem 230, there is no fluid flow established through the chemical injection valve 200. Therefore, the seal member 224 is not exposed to high pressure differential flows during transition.

After the outlet 242 travels across the seal member 224, the first stem 226 may continuously move upwards under the pressure from the inlet port 204. When the outlet 242 moves into the second volume 220 in the second tubing 218, the fluid from the inlet port 204 will exit the outlets 242 to fill the second volume 220 above the second stem 230.

At the end of the intermediate position, the head portion 230 of the first stem 226 may contact the shoulder 217 as shown in FIG. 2D. In the position shown in FIG. 2D, the second stem 230 is subjected to an upward force from the fluid pressure in the second volume 220 and a downward force from the force of the bias element 266 and the fluid pressure from the outlet port 206.

When the pressure from the inlet port 204 reaches a pre-determined opening pressure, the downward force from the fluid pressure in the second volume 220 will exceed the downward force from the bias element 266 and the pressure of the outlet port. As a result, the second stem 230 will move upward and separate from the first stem 226, thereby opening the chemical injection valve 200.

Figure 2E:
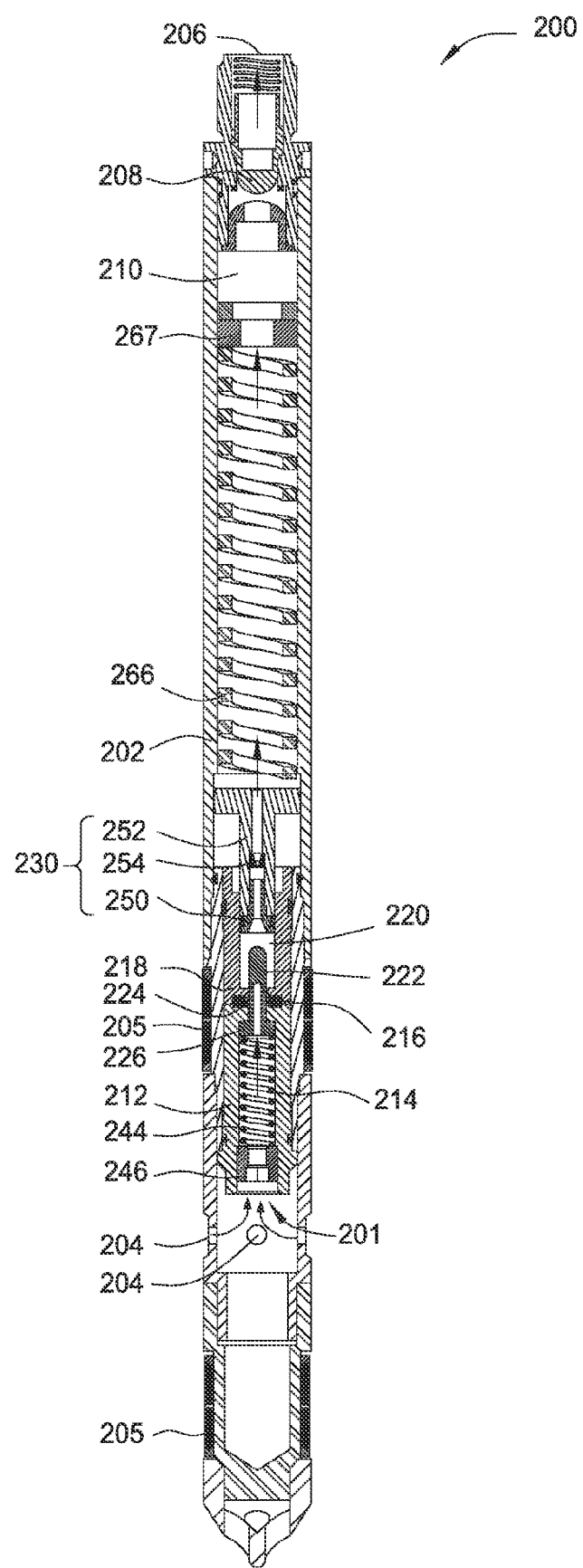
FIG. 2E is a schematic sectional view of the chemical injection valve in an open position.
Figure 2F:
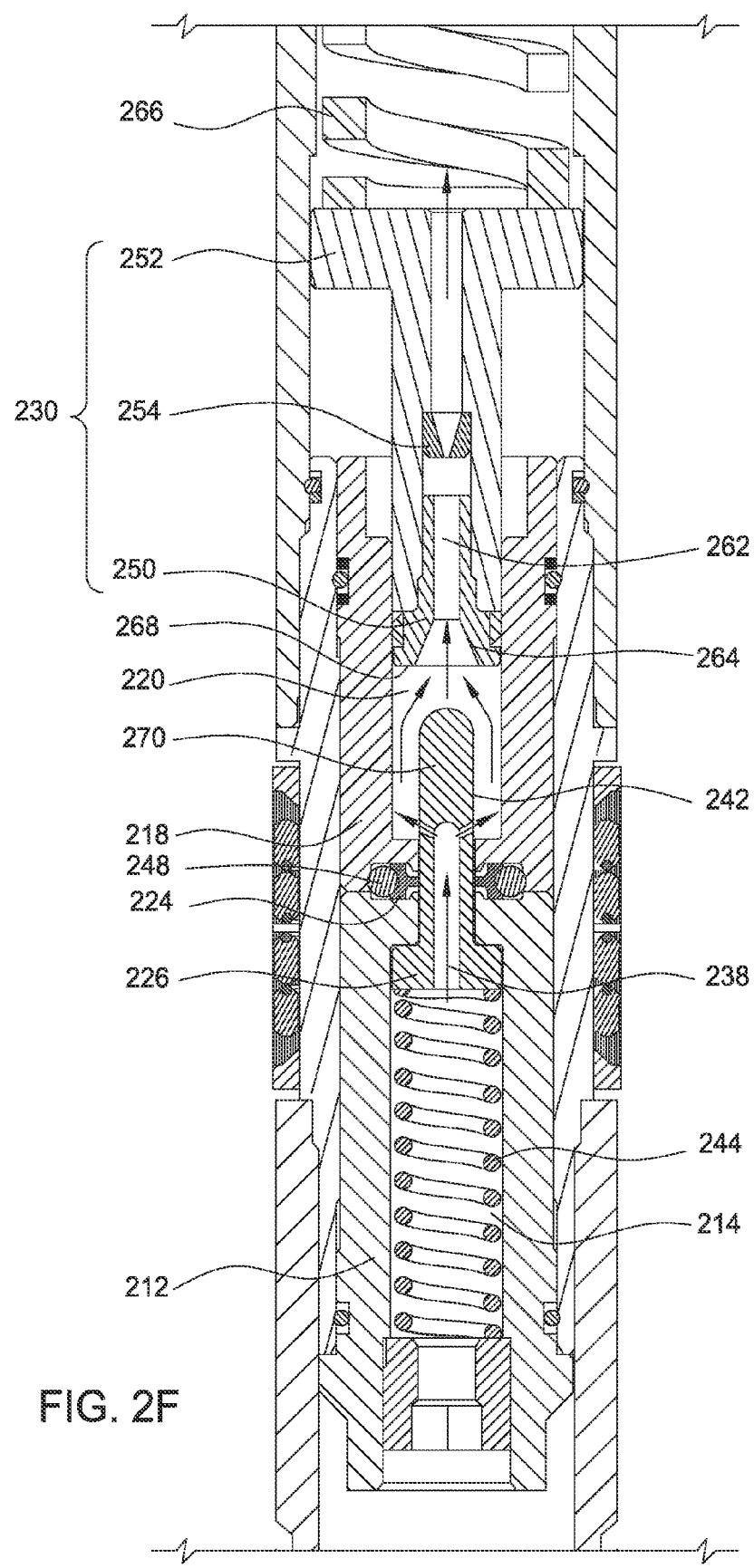
FIG. 2F is a partial enlarged view of FIG. 2E.

FIGS. 2E and 2F are schematic sectional views of the chemical injection valve 200 in an open position. In the open position, the first stem 226 extends into the second tubing 218 and the outlet 242 of the fluid channel 238 is in the second volume 220 while the second stem 230 stays separated from the first stem 226 so that the bore 262 opens to the second volume 220. Also, the fluid flow from the inlet port 204 flows through the fluid channel 238 in the first stem 226, the second volume 220, the bore 262 of the second stem 230, optionally the nozzle 254, and exits the outlet port 206. Because the seal member 224 is engaged to the first stem 226, it is not exposed to the fluid flow or pressure differential.

The amount of force from the fluid pressure in the second volume 220 required to open the valve 200 may be controlled. The opening pressure of the chemical injection valve 200 relates to the bias force from the bias element 266, the fluid pressure at the outlet port 206, and the size of the lower surface 268. The size of the lower surface 268 is determined by the inner diameter 223 of the second tubing 218 and the outer diameter 229 of the first stem 226. Because the inner diameter 223 of the second tubing 218 and the outer diameter 229 of the first stem 226 remain constant, the opening pressure can be regulated by adjusting the force of the bias element 266. For example, the opening pressure can be increased by moving the force adjustment device 267 closer to the second stem 230.

The chemical injection valve 200 may remain open when the force from the fluid pressure in the second volume 220 is balanced with the combined force of the force from the bias element 266 and the pressure at the outlet port 206. When fluid pressure from the inlet port 204 decreases, the force applied to the second stem 230 decreases, thereby causing the second stem 230 to move under the combined force of the force from the bias element 266 and the pressure at the outlet port 206. When the fluid pressure from the inlet port 204 decreases to below the opening pressure, the second stem 230 may move up to contact the first stem 226 stopping the fluid flow through the chemical injection valve 200. Further decrease of the fluid pressure in the inlet port 204 may cause the chemical injection valve 200 to return to the closed position from the intermediate position. When the first stem 226 and the second stem 230 return to the closed position, the seal member 224 is not exposed to the pressure differential flow because there is no established flow through the chemical injection valve 200. When the pressure in the inlet port 204 increases again, the chemical injection valve 200 may start a new cycle moving from the closed position to the open position.

The chemical injection valve 200 has improved erosion resistance because the seal member 224 is not exposed to the pressure differential flow. The chemical injection valve 200 also provides improved opening pressure regulation because the seal member 224 engages a surface of constant dimension and the opening pressure may be controlled by adjusting the bias element 266.

While the foregoing is directed to embodiments of the present disclosure, other and further embodiments may be devised without departing from the basic scope thereof, and the scope thereof is determined by the claims that follow.

The invention claimed is:

1. A valve, comprising:
   a housing defining an inner volume, wherein the housing has an inlet port and an outlet port;
   a seal member disposed in the housing between the inlet port and the outlet port;
   a first stem disposed in the housing, wherein the seal member engages an outer diameter of the first stem to form a seal, the seal between the seal member and the first stem divides the inner volume to an inlet volume and an outlet volume,
   a fluid channel is formed through the first stem, the fluid channel has an inlet and an outlet, the inlet of the fluid channel opens to the inlet volume, the first stem is movable relative to the seal member so that the outlet of the fluid channel travels across the seal member; and
   a second stem disposed in the housing between the seal member and the outlet port.

2. The valve of claim 1, wherein the second stem member has a bore, the first stem is movable relative to the second stem to selectively open and close the bore.

3. The valve of claim 2, wherein the bore of the second stem opens to a contact surface, the contact surface is configured to mate with the first stem to close the bore.

4. The valve of claim 3, wherein the contact surface is a conical surface.

5. The valve of claim 3, wherein the first stem has a head portion and a stem portion, a first end of the stem portion connected to the head portion, and a second end of the stem portion is shaped to engage the contact surface of the second stem.

6. The valve of claim 5, wherein the outlet of the fluid channel in the first stem is formed on the stem portion between the first end and the second end.

7. The valve of claim 2, further comprising:
   a first bias element coupled to the first stem, wherein the first bias element biases the first stem towards the second stem; and
   a second bias element coupled to the second stem, wherein the second bias element biases the second stem towards the first stem.

8. The valve of claim 3, wherein the second stem comprises:
   a base; and
   a seat, wherein the contact surface is formed on the seat.

9. The valve of claim 8, wherein the seat may be formed from tungsten carbide or metal.

10. The valve of claim 8, wherein the second stem comprises:
    a nozzle disposed in the bore.

11. The valve of claim 1, further comprising an O-ring positioned to energize the seal towards the first stem.

12. An injection valve, comprising:
    a housing having an inlet port and an outlet port;
    a seal member disposed in the housing between the inlet port and the outlet port;
    a first stem disposed in the housing and movably engaging the seal member at an outer surface of the first stem, a fluid channel formed through the first stem; and
    a second stem disposed between the outlet port and the seal member, wherein the second stem has a bore, and a closed end of the first stem selectively contacts a contact surface on the second stem around the bore to open and close the bore.

13. The injection valve of claim 12, further comprising a bias element positioned to energize the second stem towards the first stem.

14. The injection valve of claim 12, further comprising an O-ring position to energize the seal member towards the first stem.

15. The injection valve of claim 12, wherein an outlet of the fluid channel in the first stem travels across the seal member when the valve moves intermediately between an open position and a closed position.

16. The injection valve of claim 12, wherein the closed end of the first stem is formed from tungsten carbide or metal.

17. The injection valve of claim 12, wherein the seal member is formed from elastomer.

18. A method for performing chemical injection using an injection valve, comprising:
    engaging a first stem with a second stem of the injection valve to close a bore in the second stem, wherein the first stem and second stem are disposed between an inlet port and an outlet port of the injection valve, and the first stem includes a fluid channel having an inlet and an outlet;
    engaging a seal member to an outer surface of the first stem;
    supplying a fluid pressure from the inlet port to move the first stem towards the outlet port so that the outlet of the fluid channel in the first stem travels across the seal member; and
    opening the injection valve by supplying an opening pressure from the inlet port to disengage the first stem from the second stem.

19. The method of claim 18, further comprising:
    adjusting a bias member coupled to the second stem to adjust the opening pressure.

20. The method of claim 18, further comprising closing the injection valve by:
    reducing the fluid pressure from the inlet port to position the second stem in contact with the first stem; and
    moving the first stem and second stem together towards the inlet port so that the outlet of the fluid channel in the first stem travels across the seal member.

* * * * *